(12) United States Patent
Suzuki et al.

(10) Patent No.: US 7,025,947 B2
(45) Date of Patent: Apr. 11, 2006

(54) CATALYSTS FOR OXIDATIVE STEAM REFORMING OF METHANOL AS A NEW AND EFFICIENT METHOD FOR THE SELECTIVE PRODUCTION OF HYDROGEN FOR FUEL CELLS AND THEIR SYNTHESIS METHOD

(75) Inventors: Kenzi Suzuki, Aichi (JP); Velu Subramani, Aichi (JP); Toshihiko Osaki, Aichi (JP)

(73) Assignee: Japan as represented by the Seccretary of Agency of Industrial Science and Technolopgy, Tokyo (JP)

( * ) Notice: Subject to any disclaimer, the term of this patent is extended or adjusted under 35 U.S.C. 154(b) by 0 days.

(21) Appl. No.: 10/898,318

(22) Filed: Jul. 26, 2004

(65) Prior Publication Data

US 2005/0002858 A1   Jan. 6, 2005

Related U.S. Application Data

(62) Division of application No. 09/729,103, filed on Dec. 5, 2000, now abandoned.

(30) Foreign Application Priority Data

Jun. 7, 2000   (JP) ............................. 2000-170594

(51) Int. Cl.
   *C01B 3/26*   (2006.01)
   *B01J 23/70*   (2006.01)
   *B01J 23/72*   (2006.01)
(52) U.S. Cl. ...................... 423/652; 502/346
(58) Field of Classification Search ................ 423/652; 502/345, 346, 355
See application file for complete search history.

(56) References Cited

U.S. PATENT DOCUMENTS 4,666,945 A   5/1987   Osugi et al.
6,576,217 B1 *   6/2003   Nojima et al. ............... 423/651

OTHER PUBLICATIONS

S. Velu, et al., "Oxidative Steam Reforming of Methanol Over CuZNAI(Zr)-Oxide Catalysts: A New and Efficient Method for The Production of Co-Free Hydrogen For Fuel Cells," Chem. Communications, No. 23, Dec. 7, 1999, pp. 2341-2342.

S. Velu, et al., "Oxidative Steam Reforming of Methanol Over CuZnAI(ZR)-Oxide Catausts for the Selective Production of Hydrogen for Fuel Cells: Catalyst Characterization and Performance Evaluation," Journal of Catalyst, 194, 2000, pp. 373-384.

S. Velu, et al., "A Comparative Study of Reactions of Methanol Over Catalysts Derived From NiAl-and CoAO-Layered Double Hydroxidesa and Their Sn-Containing Analogues," Catalysis Letters, 69, 2000, pp. 43-50.

(Continued)

Primary Examiner—Colleen P. Cooke
(74) Attorney, Agent, or Firm—Oblon, Spivak, McClelland, Maier & Neustadt, P.C.

(57) ABSTRACT

The present invention provides a method of producing a CuZnAlZr oxide catalyst consisting of reacting an aqueous NaOH solution and aqueous $Na_2CO_3$ solution with a mixture of aqueous solutions of each nitrate of Cu, Zn, Al, and Zr, producing a precipitate by coprecipitation, aging, filtering, washing and drying this precipitate to prepare a catalyst precursor consisting of a CuZnAlZr layered double hydroxide, and then obtaining a CuZnAlZr oxide by calcining this precursor in an air ambient atmosphere, a CuZnAlZr oxide catalyst, a CuZnZrCe oxide catalyst, a CoCuZnAl oxide catalyst for producing hydrogen by oxidative steam reforming a methanol, and methods of producing hydrogen gas consisting of converting methanol to hydrogen gas by oxidative steam reforming in the presence of air and steam using these oxide catalysts.

3 Claims, 8 Drawing Sheets

OTHER PUBLICATIONS

John P. Breen, et al., Methanol Reforming for Fuel-Cell Applications: Development of Zirconia-Containing Cu-Zn-Al Cataysts,: Catalysis Today, 51, 1999, pp. 521-533.

J. L. G. Fierro, "Oxidative Methanol Reforming Reactions for the Production of Hydrogen," Studies in Surface Science and Catalysis, 130, 2000, pp. 177-186.

Alakananda Bhattacharyya, (WO9903779 A1, Jan. 28, 1999), "Preparation and Calcination of Hydrotalcite-Type Compounds as Steam Reforming Catalysts for Oxygen-Containing Feedstocks," Americal Chemical Socitey (Abstract Only).

* cited by examiner

CATALYSTS FOR OXIDATIVE STEAM REFORMING OF METHANOL AS A NEW AND EFFICIENT METHOD FOR THE SELECTIVE PRODUCTION OF HYDROGEN FOR FUEL CELLS AND THEIR SYNTHESIS METHOD

BACKGROUND OF THE INVENTION

1. Field of the Invention

The present invention relates to novel oxide catalysts, methods of producing the same, and methods of producing hydrogen gas by simultaneously performing partial oxidation and steam reforming of methanol (this reaction is called oxidative steam reforming of methanol), and in further detail, relates to novel oxide catalysts, methods of producing these catalysts from a hydrotalcite-like layered double hydroxide and the like, and methods of producing hydrogen gas with a high conversion rate and selectivity using these catalysts, each of with which it is possible to produce hydrogen gas containing no CO whatsoever, or containing only very little CO, by simultaneously promoting partial oxidation and steam reforming of methanol.

The present invention provides novel oxide catalysts, methods of producing these catalysts from a hydrotalcite-like layered double hydroxide and the like, and methods of producing hydrogen gas with a high conversion rate and selectivity using these catalysts.

2. Description of the Related Art

Hydrogen is receiving attention as a new energy source that will replace fossil fuels today when there is a fear of exhausting fossil fuels. Hydrogen is the fuel in fuel cells and is replacing electrical energy. In this case, it is a clean energy source because the only waste product after generation of electricity is water, as well as in terms of measures against global warming. Moreover, hydrogen is an energy source that favors the environment because nitrogen oxides, sulfur compounds, hydrocarbons, etc., which are a burden to the environment, are not emitted. There are two systems of fuel cells, fixed systems that are large and have high output and mobile systems that are small and lightweight, but the fuel cells being studied for use in automobiles, etc., are the latter mobile systems.

The problem here is how to obtain hydrogen. One solution is the method whereby hydrogen is obtained from methanol by any of the following reactions using a catalyst:

(1) Decomposition of methanol $CH_3OH \Leftrightarrow 2H_2 + CO$ $\Delta H = +92.0$ kJ/mol (2) Steam reforming of methanol $CH_3OH + H_2O \Leftrightarrow 3H_2 + CO_2$ $\Delta H = +49.4$ kJ/mol (3) Partial oxidation of methanol $CH_3OH + (\frac{1}{2})O_2 \Leftrightarrow 2H_2 + CO_2$ $\Delta H = -192.2$ kJ/mol $\Delta H$=heat of the reaction The above-mentioned reactions have a problem in that if the gas contains even a trace (20 ppm) of CO when the hydrogen that has been obtained is introduced to a fuel cell and converted to electricity, this CO will damage the Pt electrodes of the fuel cells and there will be a drastic reduction in output. Consequently, it is desirable that the hydrogen gas contain no CO. Nevertheless, by means of above-mentioned reaction (1), large amounts of CO are produced with the hydrogen and by means of above-mentioned reaction (2) as well, although not as much as by reaction (1), 100 ppm or more of CO are produced. Moreover, several 10 ppm CO are produced by above-mentioned reaction (3) and the hydrogen cannot be used as the fuel for fuel cells as is.

Steam is introduced and a water-gas shift reaction (WGSR), or oxidation, is performed in order to eliminate CO from hydrogen gas, but this is accompanied by a new problem in that the device is larger and cost is higher. The reaction formulas of the water-gas shift reaction and oxidation reaction are shown below:

(4) CO Water-Gas Shift Reaction $CO + H_2O \Leftrightarrow H_2 + CO_2$ (5) CO oxidation reaction $CO + (\frac{1}{2})O_2 \Leftrightarrow CO_2$ Consequently, a method of producing hydrogen with which CO is not generated by development of a new catalyst is forthcoming.

The method whereby a CuOZnO catalyst is used is a method of producing hydrogen by partial oxidation of methanol (T. Huang and S. Wang, Appl. Catal., Vol 24, (1986) p. 287).

This method showed highest activity with a Cu:Zn=40:60 catalyst at a reaction temperature of 220 to 290° C. as a result of conducting tests with a Cu:Zn (wt %) ratio=82:18 to 7:93.

However, there was sudden degradation of catalytic activity within an hour. Moreover, there was an increase in the oxygen/methanol ratio as well as an increase in the CO concentration.

Moreover, there are methods that use Cuzn oxide and CuZnAl oxide catalysts (L. Alejo, R. Iago, M. A. Pena and J. L. G. Fierro, Appl. Catal., Vol. 162 (1997) p. 281).

This CuZn-oxide catalyst is Cu:Zn=20:80 to 40:60 and this CuZnAl oxide-catalyst is Cu:Zn:Al=40:55:15.

The mixture of the catalyst precursors $Zn_5(CO_3)_2(OH)_6$, $Cu_2(CO_3)(OH)_2$ and $Zn_3Cu_2(CO_3)_2(OH)_6$ here becomes a mixture of ZnO and CuO after heating.

The reaction temperature is 200 to 230° C. and the oxygen/methanol ratio is 0.06.

There is further a method that uses Pd-supporting ZnO catalysts (M. L. Cubeiro and J. L. G. Fierro, J. Catal., Vol. 179 (1998) p. 150).

The Pd concentration of this Pd-supporting ZnO catalyst is 1 to 5 wt % and the reaction temperature is 230 to 270° C.

However, an extremely high concentration (20 to 40 mol %) of CO by-product is generated by this method.

Thus, there have been various reports of methods of producing hydrogen by partial oxidation of methanol in the past, but there are problems in that they should be further improved as methods of producing hydrogen without generating CO, and there is a strong demand for development of the same.

On the other hand, there are many reports of methods of producing hydrogen by steam reforming of methanol. However, the water-gas shift reaction or oxidation must also be used in order to eliminate the CO by-product and therefore, a larger device and an higher cost are unavoidable.

Thus, there have been many reports of method of producing hydrogen gas by partial oxidation or steam reforming of methanol in the past, but there are problems in that they should be further improved as methods of producing hydrogen gas with no CO by-product and there is a strong demand for a solution to the same.

Under such conditions, the inventors proceeded with intense studies in order to develop methods of producing hydrogen gas at a high conversion rate and high selectivity by simultaneously performing partial oxidation and steam reforming of methanol in light of the above-mentioned conventional technology and successfully completed the present invention upon (1) discovering methods of preparing oxide catalysts by making catalyst precursors consisting of a hydrotalcite-like layered double hydroxide and the like by coprecipitation and heating these at a temperature of about 450° C., and (2) successfully producing hydrogen gas containing no CO at all, or containing only very little CO, when oxidative steam reforming of methanol was performed using these oxide catalysts.

SUMMARY OF THE INVENTION

The object of the present invention is to provide catalysts for producing hydrogen by oxidative steam reforming of methanol, methods of producing the same, and methods of producing hydrogen gas using these catalysts, and this is accomplished by a method of producing a CuZnAlZr oxide catalyst consisting of reacting an aqueous NaOH solution and aqueous NACO$_3$ solution with a mixture of aqueous solutions of each nitrate of Cu, Zn, Al, and Zr, producing a precipitate by coprecipitation, aging, filtering, washing and drying this precipitate to prepare a catalyst precursor consisting of a CuZnAlZr layered double hydroxide, and then obtaining a CuznAlZr oxide by calcining this precursor in an air ambient atmosphere, a CuZnAlZr oxide catalyst, a CuZnZrCe oxide catalyst, a CoCuZnAl oxide catalyst for producing hydrogen by oxidative steam reforming of methanol, and methods of producing hydrogen gas consisting of converting methanol to hydrogen gas by oxidative steam reforming in the presence of air and steam using these oxide catalysts.

DETAILED DESCRIPTION OF THE INVENTION

It is an object of the present invention to provide novel oxide catalysts used in the production of hydrogen gas by oxidative steam reforming of methanol.

Another object of the present invention is to provide methods of producing the above-mentioned oxide catalysts from catalyst precursors consisting of a hydrotalcite-like layered double hydroxide and the like.

Yet another object of the present invention is to provide methods of producing hydrogen gas without generating CO using these catalysts.

The present invention for solving the above-mentioned problems comprises the following technical means.

(1) A method of producing a CuZnAlZr oxide catalyst, comprising the steps of:
  reacting a mixture of aqueous solutions of each nitrate of Cu, Zn, Al, and Zr with an aqueous NaOH solution and aqueous NaCO$_3$ solution;
  producing a precipitate by coprecipitation;
  aging, filtering, washing, and drying this precipitate to prepare a catalyst precursor consisting of a CuZnAlZr layered double hydroxide; and
  then calcining this catalyst precursor in an air ambient atmosphere to obtain a CuZnAlzr oxide.

(2) The method of producing a CuZnAlZr oxide catalyst according to above (1), wherein the molecular ratio of Cu, Zn, Al, and Zr in the starting solution is (Cu+Zn)/(Al+Zr)=2 to 4.

(3) A CuZnAlZr oxide catalyst for hydrogen production by oxidative steam reforming of methanol, which is produced by the method according to above (1) or (2).

(4) A CuZnZrCe oxide catalyst for hydrogen production by oxidative steam reforming of methanol, which is produced by the steps of:
  preparing a catalyst precursor consisting of aurichalcite; and
  then calcining this catalyst precursor in an air ambient atmosphere to obtain the CuZnZrCe oxide.

(5) A CoCuZnAl oxide catalyst for hydrogen production by oxidative steam reforming of methanol, which is produced by the steps of:
  preparing a catalyst precursor consisting of aurichalcite; and
  then calcining this catalyst precursor in an air ambient atmosphere to obtain the CoCuZnAl oxide.

(6) A method of producing hydrogen gas, comprising the step of:
  converting methanol to hydrogen gas by oxidative steam reforming of methanol in the presence of both air and steam using the oxide catalyst described in any of above (3) to (5).

(7) The method of producing hydrogen gas according to above (6), wherein
  oxygen/methanol (molar ratio)=0.1 to 0.5 and
  steam/methanol (molar ratio)=0.8 to 2.0.

(8) The method of producing hydrogen gas according to above (6), wherein the reaction temperature is 200 to 250° C.

BRIEF DESCRIPTION OF THE DRAWINGS

FIG. 2(A) shows that the methanol conversion rate during partial oxidation and steam reforming was low when compared to that during oxidative stream reforming and was finally 100 mol % at 290° C.

FIG. 2(B) shows that the amount of hydrogen produced was higher with oxidative stream reforming of methanol than with partial oxidation or steam reforming, with approximately 1.7-times more hydrogen being produced at a reaction temperature of 230° C.

FIG. 2(c) shows that CO selectivity was zero and CO2 selectivity was 100 mol % with oxidative steam reforming at a reaction temperature of 200 to 230° C.

DESCRIPTION OF THE PREFERRED EMBODIMENTS

Figure 1:
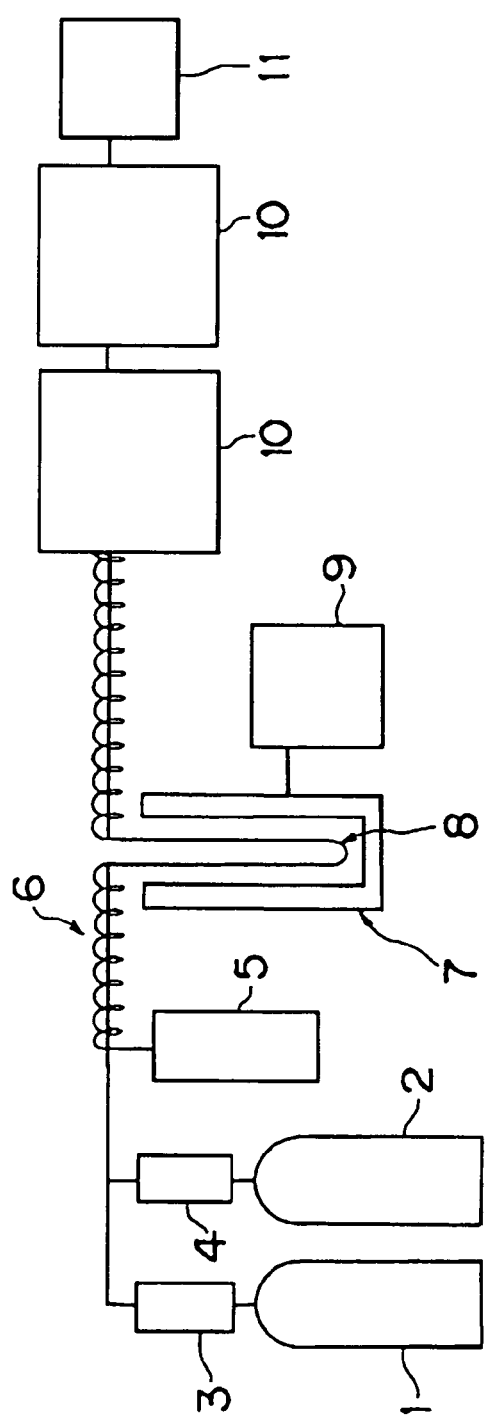
FIG. 1 is a diagram explaining the device used in the examples.

The present invention will be described in further detail below:

The novel catalysts of the present invention consist of CuZnAlZr oxide, CuZnZrCe oxide, CoCuZnAl oxide. For instance, this CuZnAlZr oxide catalyst is produced as follows. Also, CuZnZrCe oxide catalyst, CoCuZnAl oxide catalyst are produced in the same way.

A nitrate of each of Cu, Zn, Al, and Zr is prepared as the starting material. A mixture of aqueous solutions of these and aqueous NaOH solution and aqueous NaCO$_3$ solution are reacted and a precipitate is formed by coprecipitation. In this case, a precipitate is formed by adding aqueous NaOH solution, aqueous NaCO$_3$ solution, or a mixture of aqueous NaOH solution and aqueous NaCO$_3$ solution to the above-mentioned mixture a little at a time while agitating with the mixture at room temperature and pH of approximately 9.

The aqueous NaOH solution and aqueous NaCO₃ solution can be added separately or simultaneously and there is no particular restriction to the method of adding the same.

The molar ratio of the Cu, Zn, Al, and Zr in the starting materials should be (Cu+Zn)/(Al+Zr)=2 to 4. Furthermore, it is not a problem if there are no molecules of either the Al or Zr in (Al+Zr). That is, the molecular ratio in this case is preferably (Cu+Zn)/Zr=2 to 4 or (Cu+Zn)/Al=2 to 4.

Next, the above-mentioned precipitate is aged at approximately 65° C. and filtered and then this is washed with deionized water, etc., until the pH of the filtrate becomes neutral and dried to prepare a catalyst precursor consisting of a hydrotalcite-like CuZnAlZr layered double hydroxide. There are no particular restrictions to these means and conditions.

Then this catalyst precursor consisting of hydrotalcite-like layered double hydroxide is calcined in an air ambient atmosphere at, for instance, approximately 450° C. to prepare the CuZnAlZr oxide. The method in which the above-mentioned catalyst precursor is introduced to an electric oven and kept at approximately 450° C. for approximately 5 hours after raising temperature from room temperature at approximately 10° C. min⁻¹ is an ideal example of the methods and conditions of calcination. However, there are no particular restrictions as long they are a heating temperature and heating time at which the above-mentioned catalyst precursor will calcine.

Next, by means of the method of the present invention, hydrogen gas is produced by converting methanol to hydrogen gas by oxidative steam reforming in the presence of both air and steam using the oxide catalysts produced by the above-mentioned methods. However, in this case, hydrogen gas is produced without any CO by-product being produced, or only very little Co by-product being produced.

In this case, the oxygen/methanol molar ratio is preferably 0.1 to 0.5 and the steam/methanol (molar ratio) is ideally 0.8 to 2.0. Hydrogen gas is produced at a high conversion rate and high selectivity within these ranges. Moreover, the reaction time is 200 to 250° C., more preferably 220 to 240° C.

The present invention is useful as one that makes it possible to provide methods of producing hydrogen gas without producing CO by-product by oxidative steam reforming of methanol.

EXAMPLES

The present invention will be explained in more specific terms with examples, but the present invention is not limited in any way to the following examples:

Example 1

Catalyst precursor and catalyst were prepared in the present example.

1) Method

A precipitate was formed by adding aqueous NaOH solution (concentration of approximately 2 M), an aqueous NaCO₃ solution (concentration of approximately 0.3 M), or a mixture of aqueous NaOH solution (concentration of approximately 2 M) and aqueous NaCO₃ solution (concentration of approximately 0.3 M) a little at a time to a mixture of aqueous solutions of each nitrate of Cu, Zn, Al, and Zr (mixed so that the molecular ratio of Cu, Zn, Al, and Zr would be one of (Cu+zn)/(Zl+Zr)=2 to 4, (Cu+Zn)/Zr=2 to 4, (Cu+Zn)/Al=2 to 4) while agitating with the mixture at room temperature and pH of approximately 9.

Next, the precipitate was aged while stirring for 30 minutes at 65° C. and filtered. The precipitate was then washed several times (3 to 5 times) with deionized water until pH of the filtrate became 7. It was dried at 70° C. to prepare the CuZnAlZr layered double hydroxide (precursor catalyst).

Then this CuZnAlZr layered double hydroxide (catalyst precursor) was heated for 5 hours at 450° C. in an electric furnace with an air ambient atmosphere to prepare the CuZnAlZr oxide (catalyst of the present invention).

2) Results

The physical and chemical properties of the CuZnAlZr oxide catalyst synthesized in this example (after heating at 450° C.) are shown in Table 1.

The name of the catalyst is represented by CZAZ-A through F in Table 1. The molecular ratio of the metal Cu, Zn, Al, and Zr in the precursor is the result of X-ray fluorescence spectroscopy determination, the $S_{BET}$ is the surface area found by the nitrogen adsorption method, the amount of H₂ consumed is the result found from TPR (temperature programmed reduction)-N₂O determinations, and $C_{Cu}$, $D_{Cu}$, and $t_{Cu}$ are the specific surface area, degree of dispersion and Cu crystallite size, respectively.

TABLE 1

Physicochemical properties of CuZnAl(Zr)-oxide catalysts

| Catalyst | Metal composition of the precursors (atomic ratio)[a] | | | | $S_{BET}$/ m² g⁻¹ | H₂ consumption[b]/ mmol g⁻¹ | $S_{cu}$/m² g⁻¹ | $D_{cu}$ (%) | $t_{Cu}$/Å |
|---|---|---|---|---|---|---|---|---|---|
| | Cu | Zn | Al | Zr | | | | | |
| CZAZ-A | 0.73 | 0.88 | 1.00 | 0.00 | 56 | 3.3 | 203 | 38.6 | 26 |
| CZAZ-B | 1.02 | 1.30 | 1.00 | 0.00 | 71 | 3.6 | 181 | 34.3 | 29 |
| CZAZ-C | 1.42 | 1.71 | 1.00 | 0.00 | 84 | 6.0 | 176 | 33.4 | 30 |
| CZAZ-D | 1.37 | 1.80 | 1.00 | 0.00 | 108 | 4.2 | 227 | 43.1 | 23 |
| CZAZ-E | 1.40 | 1.65 | 0.45 | 0.55 | 82 | 4.7 | 232 | 44.0 | 23 |
| CZAZ-F | 1.38 | 1.72 | 0.00 | 1.00 | 75 | 4.3 | 279 | 52.9 | 19 |

[a]Determined by X-ray fluorescence spectroscopy.
[b]Hydrogen consumption estimated by the temperature programmed reduction (TPR) experiments.

Example 2

Production of Hydrogen Gas by Oxidative Steam Reforming of Methanol

1) Device

The catalyst experimental device for oxidative steam reforming used in experiments of the catalysts of the present example is shown in FIG. 1. This device consists of the following constituents:

Structure: small electric furnace 7, quartz glass reaction tube 8 (diameter=4 mm), microfeeder 5 (device for feeding mixture of methanol and water), gas chromatograph 10 (gas analyzer), recorder 11 (for recording output of gas chromatograph), argon gas cylinder 1, air cylinder 2 (oxygen concentration of 20.2%, nitrogen concentration of 79.8%), temperature controller 9, ribbon heater 6, and devices 3 and 4 for adjusting the flow rate.

2) Conditions and Method for Experiments

The experimental conditions are shown below:

connected on line. A 2 m long separation column packed with porapak Q was attached to 1 gas chromatograph and the water and methanol were analyzed. A 2 ml long separation column packed with active charcoal was attached to the second gas chromatograph and the hydrogen, air, CO, $CO_2$, and methane were analyzed. Incidentally, the determination data 25 hours after starting the reaction were used.

3) Catalyst

The 6 types of CuZnAlZr oxide catalysts of CZAZ-A through F in Table 1 was subjected to reduction and then the catalytic performance thereof was determined.

4) Determination Results

The determination results when the reaction temperature was 230° C. are shown in Table 2. In Table 2, the methanol conversion rate of each catalyst is shown by mol % and mmol kg (catalyst)$^{-1}$ s$^{-1}$, the amount of hydrogen produced is shown by mmol kg (catalyst)$^{-1}$ s$^{-1}$, and the TOF is shown by $\times 10^3$ s$^{-1}$. Furthermore, CO and $CO_2$ selectivity (mol %) are shown.

TABLE 2

Performance of various CuZnAl(Zr)-oxide catalysts in the oxidative steam reforming of methanol after 25 h of on-stream operation at 230° C.

| Catalyst | MeOH conversion | | $H_2$ production rate/ | | $H_2$ production rate/$CH_3OH$ | Carbon selectivity (mol %) | |
|---|---|---|---|---|---|---|---|
| | mol % | Rate/mmol kg$^{-1}$ s$^{-1}$ | mmol kg$^{-1}$ s$^{-1}$ | TOF/$10^3$ s$^{-1}$ | conversion rate | CO | $CO_2$ |
| CZAZ-A | 37.6 | 177 | 378 | 77 | 2.1 | 0.0 | 100 |
| CZAZ-B | 65.4 | 297 | 730 | 166 | 2.5 | 0.0 | 100 |
| CZAZ-C | 68.1 | 348 | 900 | 211 | 2.6 | 0.0 | 100 |
| CZAZ-C[a] | 100.0 | 215 | 542 | 127 | 2.5 | 0.0 | 100 |
| CZAZ-D | 79.6 | 468 | 1210 | 215 | 2.6 | 1.2 | 98.8 |
| CZAZ-E | 85.4 | 630 | 1626 | 254 | 2.6 | 1.1 | 98.9 |
| CZAZ-F | 90.0 | 661 | 1714 | 295 | 2.6 | 0.8 | 99.2 |

[a]$CH_3OH$: 8.8 cm$^3$ min$^{-1}$; $H_2O$: 11.4 cm$^3$ min$^{-1}$.

(a) Experimental Method

The experiments were performed under the following conditions with a normal pressure fixed bed flow-through system.

Amount of catalyst used: 90 mg
Catalyst particle diameter: 0.30 to 0.355 mm in diameter
Reaction temperature: 180 to 290° C.

(b) Reduction Method

The CuZnAlZr oxide catalyst was subjected to reduction before the determinations of catalytic performance thereof.

That is, the catalyst temperature was raised from room temperature to 300° C. at 5° C. min$^{-1}$ while running hydrogen at 10 cm$^3$ min$^{-1}$ through 90 mg CuZnAlZr oxide catalyst packed in the quartz glass reaction tube. After being kept for 2 hours at 300° C., temperature was lowered to the determination temperature and the product was submitted to the determinations.

(c) Determination Method

Water/methanol (molar ratio)=1.3 was introduced to the catalyst layer at a rate of 1.6 or 2.5 cm$^3$ h$^{-1}$ using a microfeeder. Air (oxygen concentration of 20.2%, nitrogen concentration of 79.8%) was introduced at 10 to 20 cm$^3$ min$^{-1}$ and argon gas was introduced as carrier gas at 43 cm$^3$ min$^{-1}$. The reaction product and unreacted matter were analyzed by 2 gas chromatographs (with TCD detectors)

Example 3

Figure 2:
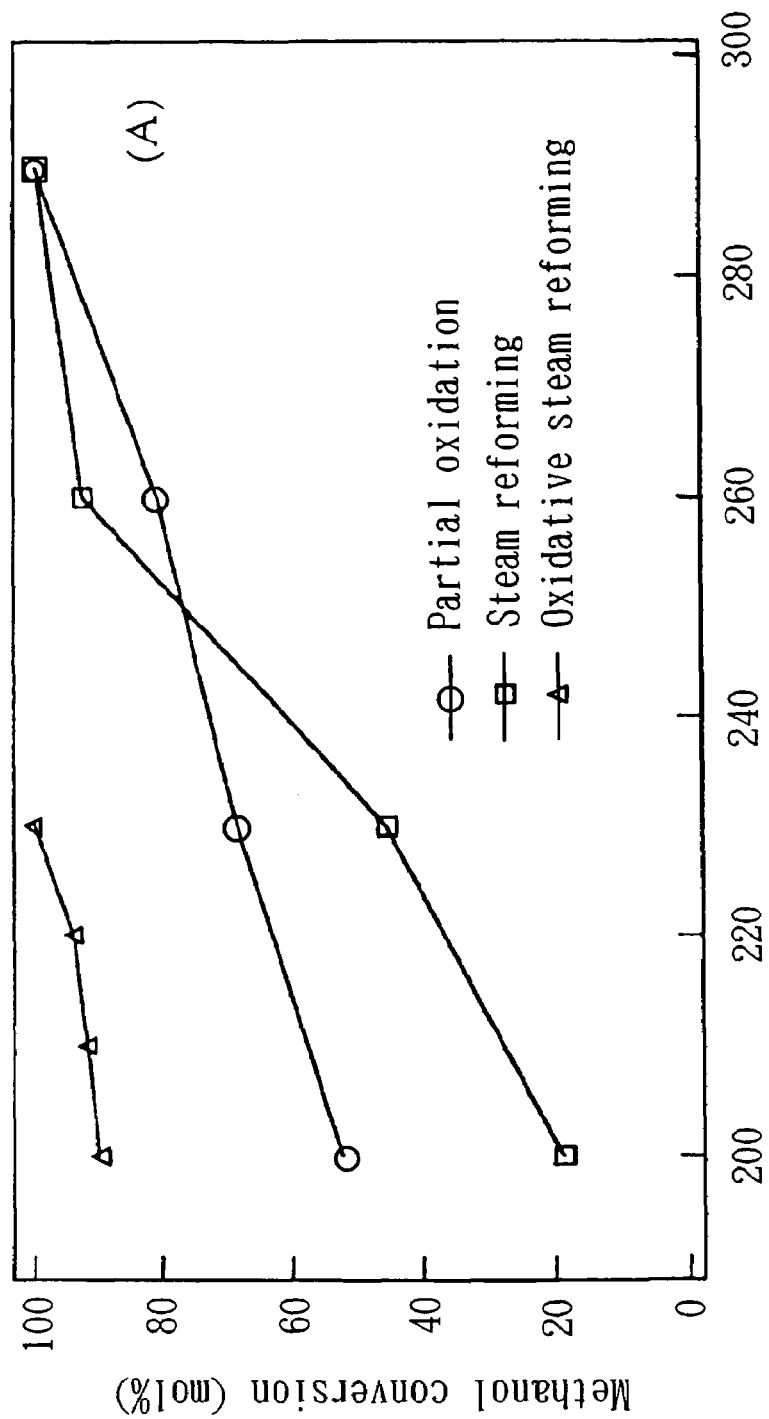
FIG. 2 is an explanatory diagram showing the effects of reaction temperature on partial oxidation, steam reforming, and oxidative reforming of methanol using CZAZ-C catalyst.
Figure 2:
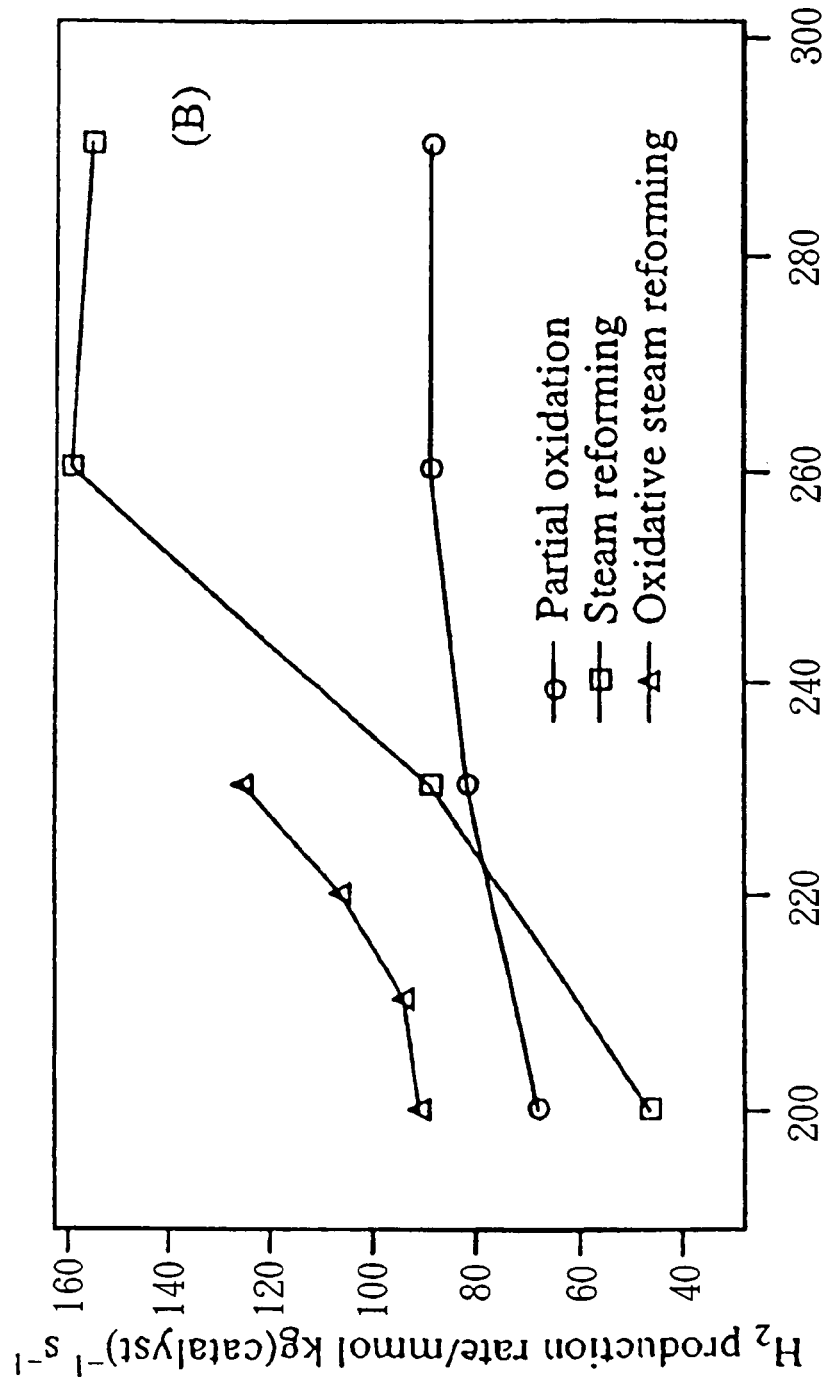
Figure 2:
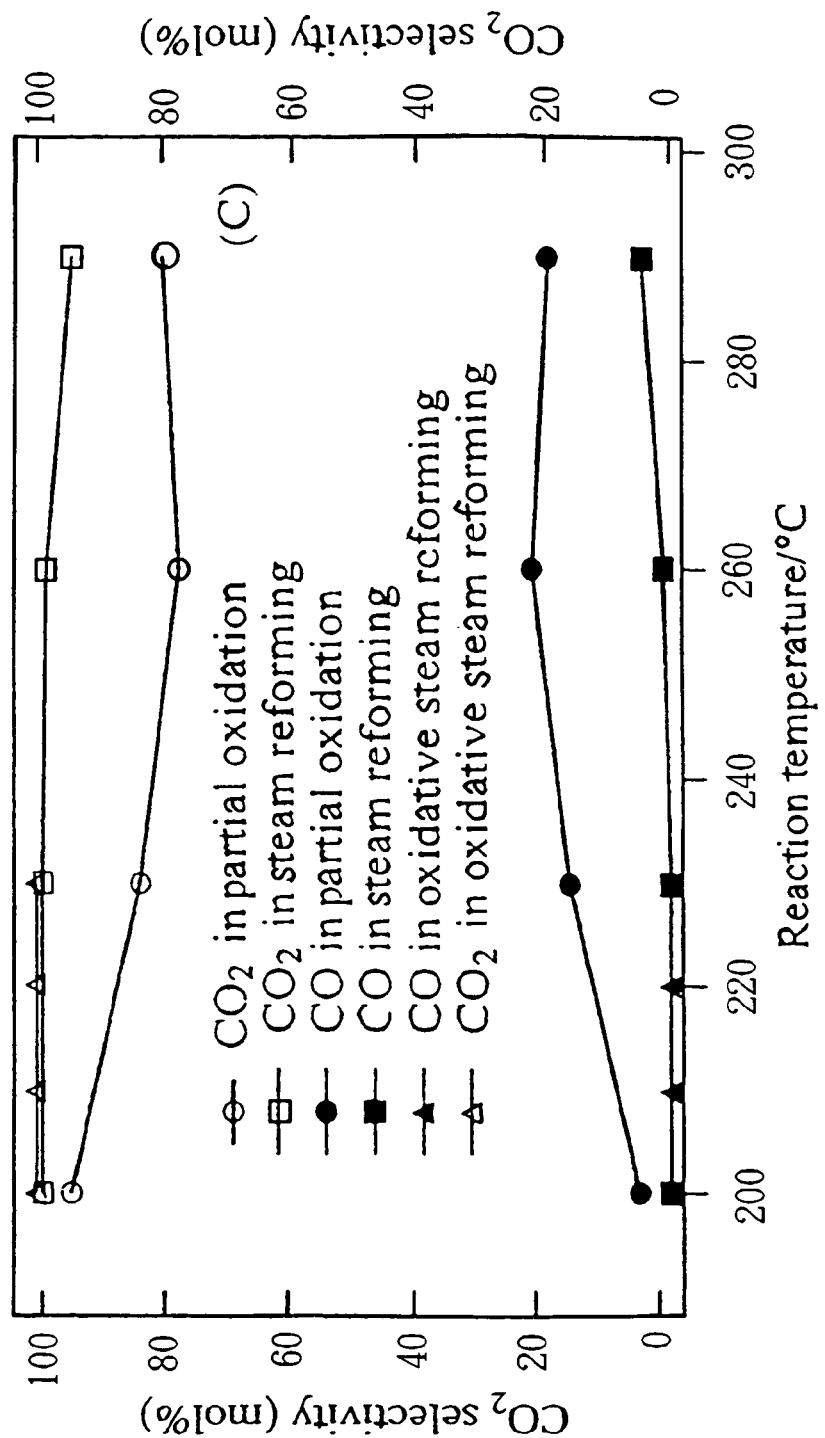
Figure 3:
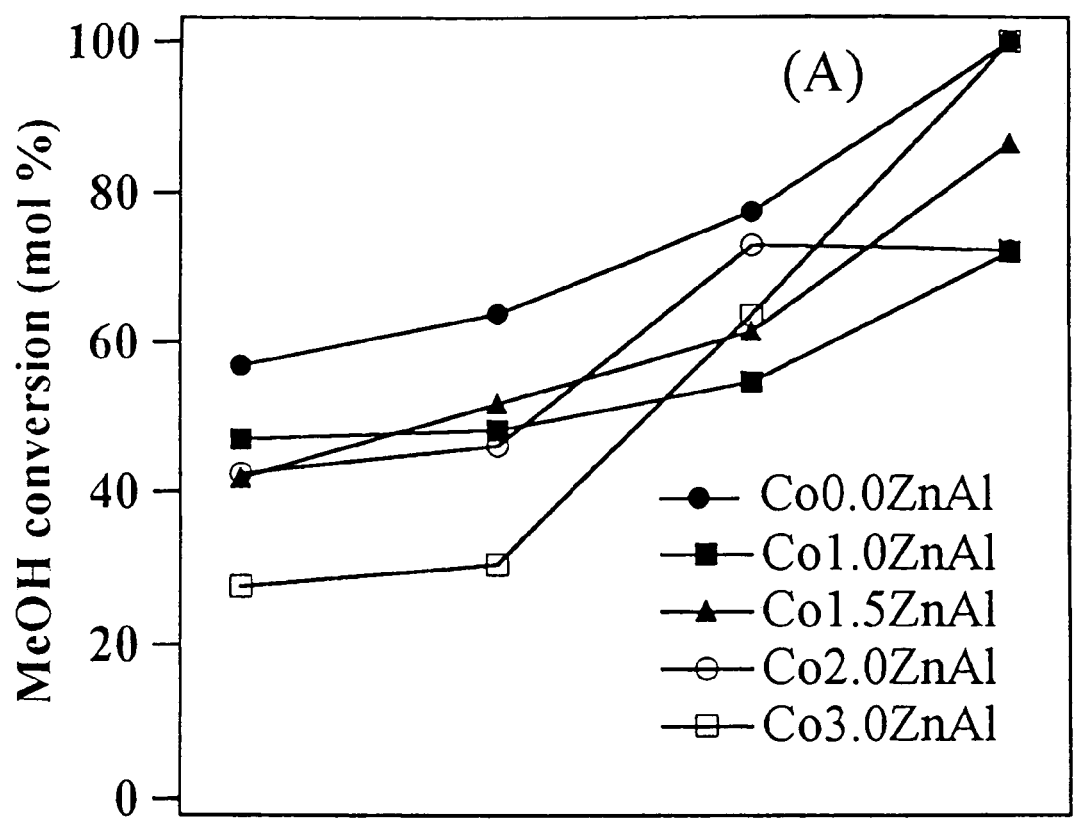
FIG. 3 is an explanatory diagram showing the effects of temperature on catalytic performance over CoCuZnAl-oxide catalysts in the oxidative steam reforming of methanol reaction. (A) MeOH conversion, (B) H$_2$ production rate, (C) CO production rate, (D) CO$_2$ production rate.
Figure 3:
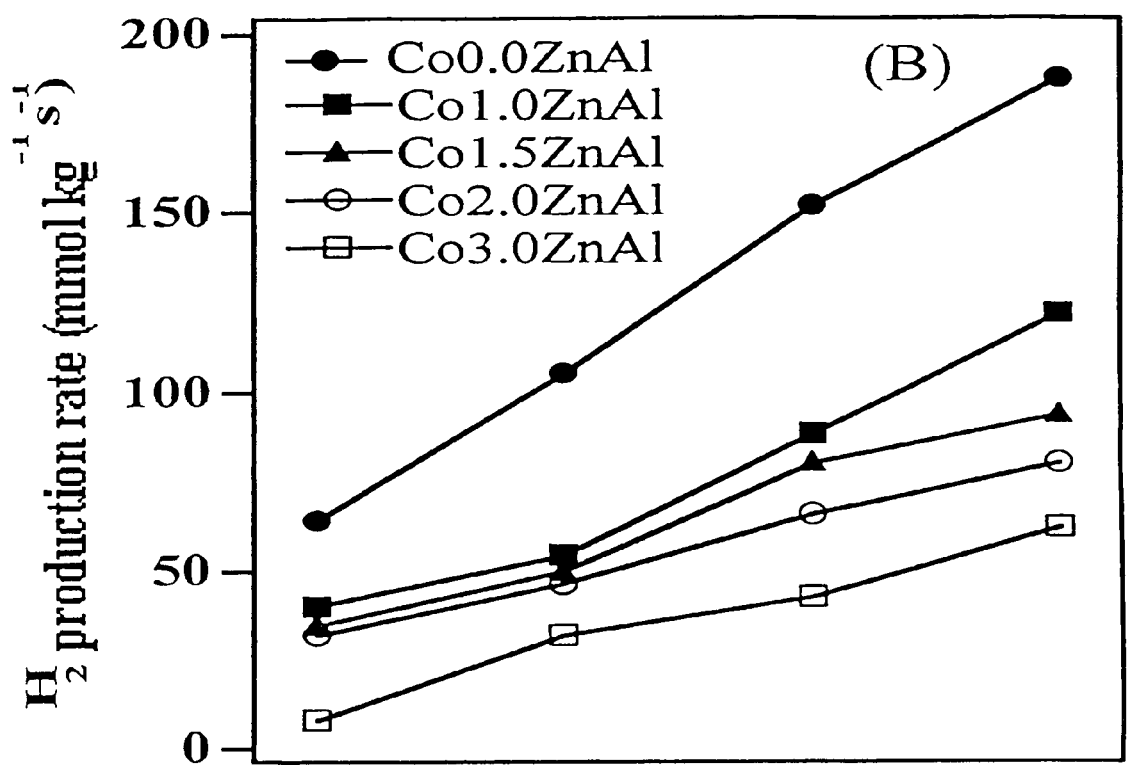
Figure 3:
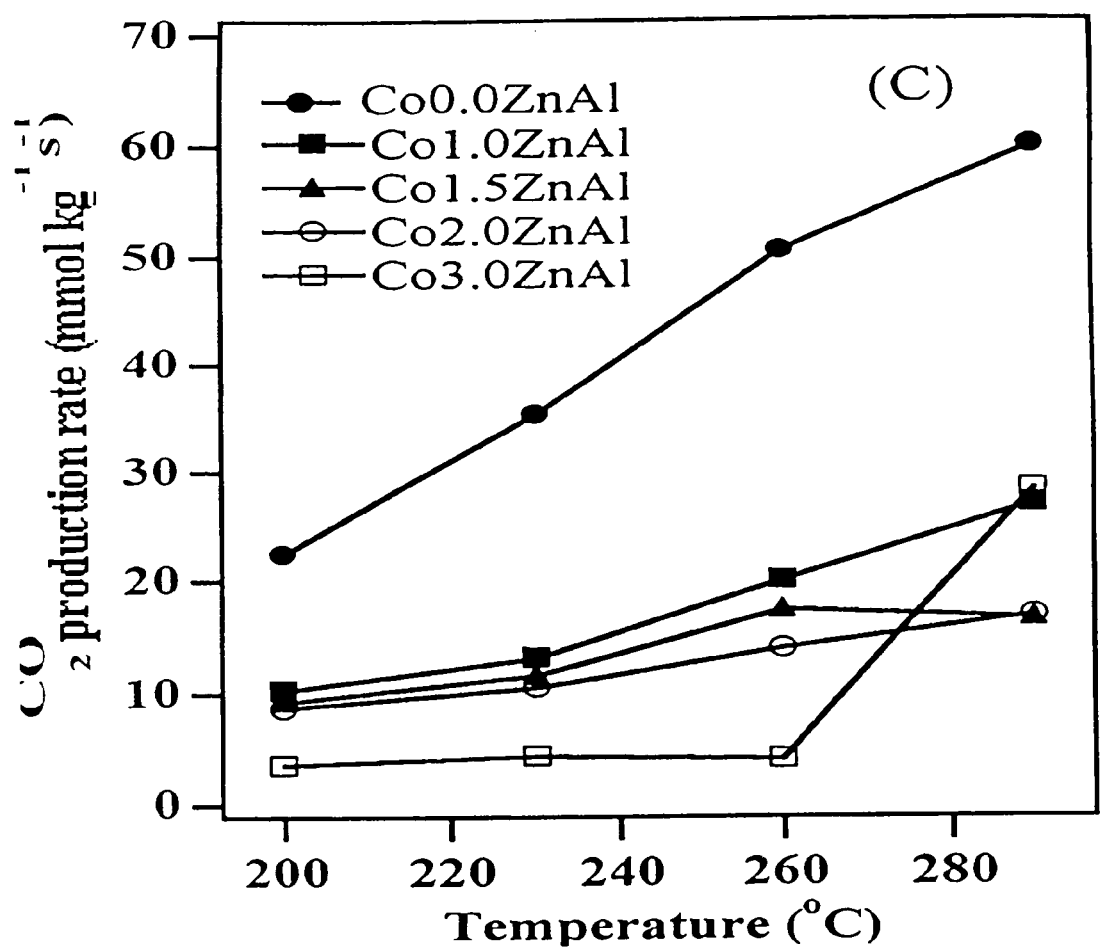
Figure 3:
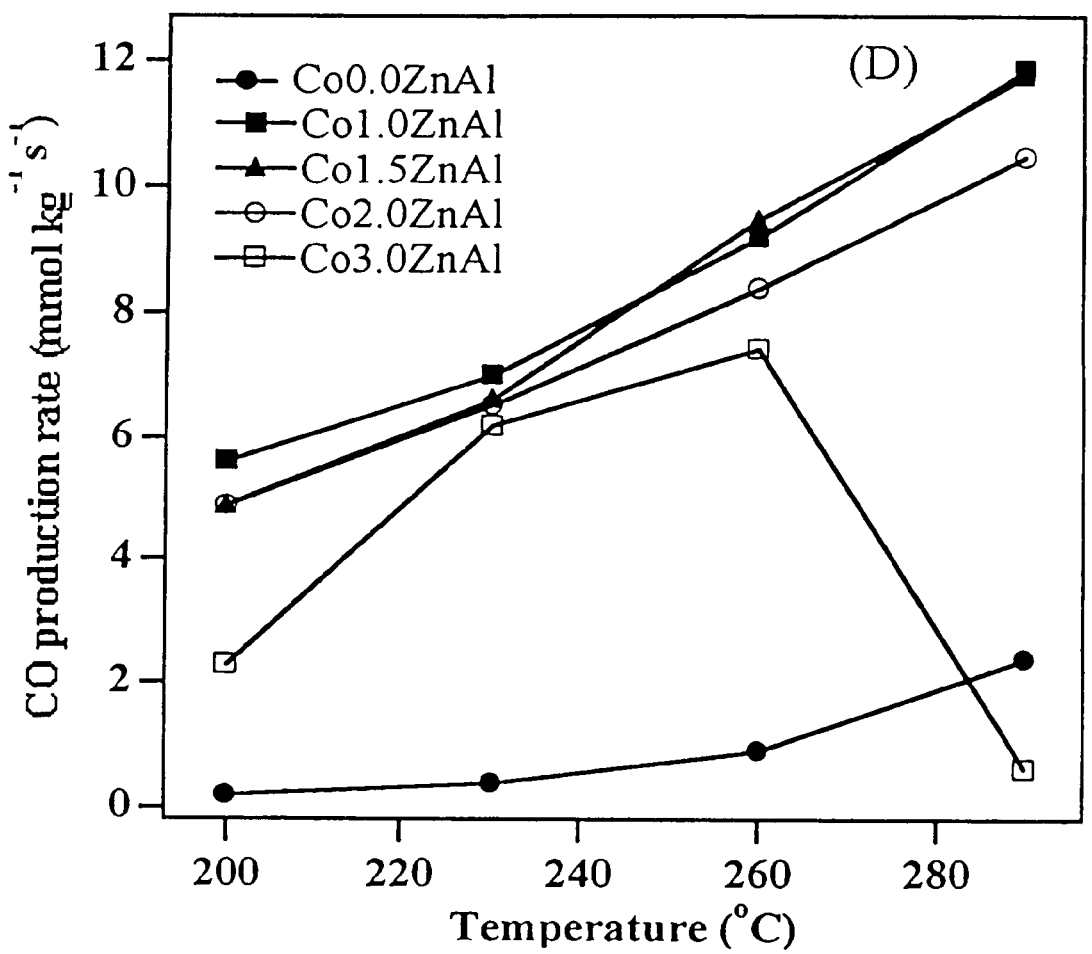

Comparison of Methanol Partial Oxidation, Steam Reforming and Oxidative Steam Reforming The results using catalyst CZAZ-C at a reaction temperature of 200 to 290° C. are shown in FIG. 2. (A) in the figure shows the methanol conversion rate, (B) shows the amount of hydrogen produced, and (C) shows the results of CO and $CO_2$ selectivity.

The methanol conversion rate during oxidative steam reforming increased as the reaction temperature rose from 200° C. and was already 100 mol % at 230° C. On the other hand, the methanol conversion rate during partial oxidation and steam reforming was low when compared to that during oxidative steam reforming and was finally 100 mol % at 290° C. (FIG. 2(A)). It was judged that the amount of hydrogen produced was higher with oxidative steam reforming of methanol than with partial oxidation or steam reforming, with approximately 1.7-times more hydrogen being produced at a reaction temperature of 230° C. (FIG. 2(B)). Moreover, CO selectivity was zero and $CO_2$ selectivity was 100 mol % with oxidative steam reforming at a reaction temperature of 200 to 230° C. (FIG. 2(C)).

Example 4

CuZnZrCe oxide catalysts were prepared in the present example.

1) Method

Diammonium Cerium (IV) nitrate (Ceric ammonium nitrate) salt, Ce(IV)SO$_4$ or Ce(III)NO$_3$ was used as precursor for the preparation of all catalysts. All the catalyst precursors were prepared by coprecipitation method at a constant pH of around 10 at room temperature followed by aging at 65° C. for 30 min in the same way as described in the Example 1. Catalysts were obtained after calcination of precursors at 450° C. for 5 h in a muffle furnace.

2) Results

Chemical composition and XRD phases of CuZnZrCe oxide catalysts synthesized in this example and their precursors are shown in Table 3.

Example 5
Production of Hydrogen Gas by Oxidative Steam Reforming of Methanol 1) Device The device used in the Example 2 was used in this example.

2) Conditions and Method for Experiments

The experimental conditions are shown below:
Reaction conditions: Catalyst weight=100 mg; Reduced at 300° C. for 4 h in flowing H$_2$; Reaction temperature=230° C.; H$_2$O/CH$_3$OH=1.6; flow rate of feed=2.0 cc/h; O$_2$/CH$_3$OH=0.25; flow rate of air=8.8 cc/min. No Ar carrier gas was passed. Results collected after 12 h of on-stream operation.

Outlet CO level was determined using a methanizer-FID GC assembly.

3) Catalyst

The 7 types of CuZnZrCe oxide catalysts in Table 3 were subjected to reduction and then the catalytic performance thereof was determined.

4) Determination Results

The determination results when the reaction temperature was 230° C. are shown in Table 4.

TABLE 3

Chemical composition and XRD phases of CuZnZrCe-oxide catalysts and their precursors

| Catalyst | Cu:Zn:Zr:Ce (wt %) | XRD phase obtained | |
|---|---|---|---|
| | | Uncalcined samples | Calcined samples (450° C./5 h) |
| CuZnCe-1 | 35.5:39.5:15.0:10.0 | Aurichalcite + Hydrozincite | CuO + ZnO |
| CuZnCe-2 | 35.5:49.5:0.0:15.0 | Aurichalcite + Hydrozincite | CuO + ZnO + CeO$_2$ |
| CuZnCe-3 | 35.5:29.5:15.0:20.0 | Aurichalcite + Hydrozincite | CuO + ZnO + CeO$_2$ |
| CuZnCe-4 | 35.5:9.5:15.0:40.0 | Aurichalcite + CeO$_2$ | CuO + ZnO + CeO$_2$ |
| CuZnCe-5 | 35.5:0.0:4.5:60.0 | Aurichalcite + CeO$_2$ | CuO + CeO$_2$ |
| CuZnCe-6[a] | 35.5:29.5:15.0:20.0 | Aurichalcite + Hydrozincite | CuO + ZnO + CeO$_2$ |
| CuZnCe-7[b] | 35.5:29.5:15.0:20.0 | Aurichalcite + Hydrozincite | CuO + ZnO + CeO$_2$ |

Aurichacite = (Zn, Cu)$_5$(CO$_3$)$_2$(OH)$_6$; (JCPDS file No. 7-743)
Hydrozincite = Zn$_5$(CO$_3$)$_2$(OH)$_6$; (JCPDS file No. 19-1458)
[a]Ce(IV)SO$_4$ was used as precursor
[b]Ce(III)NO$_3$ was used as precursor

TABLE 4

Catalytic results of the oxidative steam reforming of methanol (OSRM) reaction over CuZnZrCe-oxide catalysts

| Catalyst | MeOH conversion (mol %) | Rate of product formation [mmol kg(catatyst)$^{-1}$ s$^{-1}$] | | | *Outlet CO level (mol %) | RH$_2$/RMeOH[#] |
|---|---|---|---|---|---|---|
| | | H$_2$ | CO | CO$_2$ | | |
| CuZnCe-1 | 66.8 | 101.4 | 0.23 | 35.2 | 0.090 | 2.86 |
| CuZnCe-2 | 71.8 | 110.1 | 0.37 | 37.7 | 0.130 | 2.89 |
| CuZnCe-3 | 78.5 | 120.5 | 0.24 | 41.4 | 0.087 | 2.90 |
| CuZnCe-4 | 69.4 | 104.6 | 0.24 | 36.6 | 0.093 | 2.84 |
| CuZnCe-5 | 36.8 | 53.7 | 0.32 | 19.2 | 0.170 | 2.74 |
| CuZnCe-6 | 66.7 | 107.6 | 0.70 | 34.7 | 0.28 | 3.05 |
| CuZnCe-7 | 48.4 | 75.4 | 0.17 | 25.5 | 0.087 | 2.94 |

Reaction conditions:
Catalyst weight = 100 mg; Reduced at 300° C. for 4 h in flowing H$_2$; Reaction temperature = 230° C.; H$_2$O/CH$_3$OH = 1.6; flow rate of feed = 2.0 cc/h; O$_2$/CH$_3$OH = 0.25; flow rate of air = 8.8 cc/min. No Ar carrier gas was passed. Results collected after 12 h of on-stream operation
*Outlet CO level determined using a methanizer-FID GC assembly
[#]Ratio of rate of H$_2$ production to rate of methanol conversion $RH_2/RMeOH$ shows ratio of rate of $H_2$ production to rate of methanol conversion.

CuZnCe- or CuZnZrCe-oxide catalysts are new for the oxidative steam reforming of methanol (OSRM) reaction. These catalysts have not been reported so far even for the traditional steam reforming of methanol (SRM) or partial oxidation of methanol (POM) reactions for $H_2$ production. OSRM reaction over these new series of catalysts in the temperature range 200 to 250° C. produces $H_2$ gas with very low outlet CO concentration.

Example 6

CoCuZnAl oxide catalysts were prepared in the present example.

1) Method

All the LDH precursors were prepared by coprecipitation method at a constant pH of around 10 at room temperature followed by aging at 65° C. for 30 min in the same way as described in the Example 1. Catalysts were obtained after calcination of precursors at 450° C. for 5 h in a muffle furnace.

2) Results

Chemical composition and XRD phases of CoCuZnAl oxide catalysts synthesized in this example are shown in Table 5.

Example 7

Production of Hydrogen Gas by Oidative Steam Reforming of Methanol

1) Device

The device used in the Example 2 was used in this example.

2) Conditions and Method for Experiments

The experimental conditions are shown below:

Reaction conditions: Catalyst weight=100 mg; Reduced at 700° C. for 4 h in flowing $H_2$; $H_2O/CH_3OH$=1.6; flow rate of feed=2.0 cc/h; $O_2/CH_3OH$=0.25; flow rate of air=8.8 cc/min. No Ar carrier gas was passed. Results collected after 5 h of on-stream operation.

Outlet CO level was determined using a methanizer-FID GC assembly.

3) Catalyst

The 5 types of CoCuZnAl oxide catalysts in Table 5 were subjected to reduction and the catalytic performance thereof was determined.

4) Determination Results

Results of exidative steam reforming of methanol (OSRM) reaction over CoCuZnAl oxide catalysts are shown Table 6.

TABLE 5

Chemical compostion and XRD phases of CoCuZnAl-oxide catalysts

| | Co:Cu:Zn:Al | XRD phase obtained | |
|---|---|---|---|
| Catalyst | Atomic ratio | Uncalcined samples | Calcined samples (450° C./5 h) |
| Co3ZnAl-LDH | 3.0:0.0:1.0:1.0 | LDH | Non-stoichiometric Co-spinel |
| Co2ZnAl-LDH | 2.0:1.0:1.0:1.0 | LDH | Non-stoichiometric Co-spinel |
| Co1.5ZnAl-LDH | 1.5:1.5:1.0:1.0 | LDH + Malachite | Non-stoichiometric Co-spinel + CuO |
| Co1ZnAl-LDH | 1.0:2.0:1.0:1.0 | LDH + Malachite | Non-stoichiometric Co-spinel + CuO |
| Co0ZnAl-LDH | 0.0:3.0:1.0:1.0 | LDH + Malachite | Non-stoichiometric Co-spinel + CuO + ZnO |

LDH = Layered double hydroxide with hydrotalcite structure (JCPDS file No: 22-700)
Malachite = $Cu_2(CO_3)(OH)_2$; JCPDS file No. 41-1390

TABLE 6

Results of Oxidative steam reforming of methanol (OSRM) reaction over CoCuZnAl-oxide catalysts

| Catalyst | Reaction Temp. (° C.) | MeOH conversion (mol %) | Rate of product formation [mmol kg(catalyst)$^{-1}$ s$^{-1}$] | | | | *Outlet CO level (mol %) | #$RH_2/RCH_3OH$ |
|---|---|---|---|---|---|---|---|---|
| | | | $H_2$ | $CO_2$ | CO | $CH_4$ | | |
| Co0ZnAl-LDH | 200 | 56.8 | 63.8 | 22.6 | 0.2 | 0 | 0.11 | 2.8 |
| | 230 | 63.8 | 104.9 | 35.5 | 0.4 | 0 | 0.14 | 2.9 |
| | 260 | 77.4 | 152.1 | 50.5 | 0.9 | 0 | 0.27 | 3.0 |
| | 290 | 100 | 187.6 | 60.1 | 2.4 | 0 | 0.66 | 3.0 |
| Co1ZnAl-LDH | 200 | 46.9 | 40.1 | 10.2 | 5.6 | 0 | 3.40 | 2.5 |
| | 230 | 48.1 | 54.6 | 13.2 | 7.0 | 0 | 3.68 | 2.7 |
| | 260 | 54.6 | 88.2 | 20.0 | 9.2 | 0 | 3.77 | 3.0 |
| | 290 | 72.1 | 122.2 | 27.2 | 11.9 | 0 | 4.04 | 3.1 |
| Co1.5ZnAl-LDH | 200 | 41.7 | 34.4 | 9.0 | 4.9 | 0 | 3.32 | 2.5 |
| | 230 | 51.7 | 49.8 | 11.4 | 6.6 | 0 | 3.71 | 2.8 |
| | 260 | 61.4 | 80.1 | 17.3 | 9.5 | 0 | 3.90 | 3.0 |
| | 290 | 86.6 | 93.6 | 16.5 | 11.8 | 0 | 4.50 | 3.1 |
| Co2ZnAl-LDH | 200 | 42.3 | 32.4 | 8.7 | 4.9 | 0 | 3.44 | 2.4 |
| | 230 | 46.0 | 46.5 | 10.4 | 6.5 | 0 | 3.78 | 2.8 |
| | 260 | 73.0 | 66.2 | 13.9 | 8.4 | 0 | 4.11 | 3.0 |
| | 290 | 72.3 | 79.7 | 16.9 | 10.5 | 0.1 | 4.58 | 3.0 |

TABLE 6-continued

Results of Oxidative steam reforming of methanol (OSRM) reaction over CoCuZnAl-oxide catalysts

| Catalyst | | Reaction Temp. (° C.) | MeOH conversion (mol %) | Rate of product formation [mmol kg(catalyst)$^{-1}$ s$^{-1}$] | | | | *Outlet CO level (mol %) | #RH$_2$/RCH$_3$OH |
|---|---|---|---|---|---|---|---|---|---|
| | | | | H$_2$ | CO$_2$ | CO | CH$_4$ | | |
| Co3ZnAl-LDH | | 200 | 27.5 | 8.0 | 3.6 | 2.3 | 0 | 2.58 | 1.4 |
| | | 230 | 30.4 | 31.9 | 4.3 | 6.2 | 0.2 | 4.16 | 3.0 |
| | | 260 | 63.6 | 42.5 | 4.0 | 7.4 | 0.5 | 4.52 | 3.6 |
| | | 290 | 100 | 62.6 | 28.3 | 0.6 | 13.0 | 0.25 | 1.5 |
| Co2ZnAl-LDH | Reduced | 230 | 40.9 | 43.2 | 8.2 | 6.8 | 0 | 4.04 | 2.9 |
| | at 300° C. | 290 | 96.3 | 143.5 | 27.5 | 14.7 | 0.6 | 4.45 | 3.3 |
| | Reduced | 230 | 48.8 | 47.4 | 12.8 | 6.2 | 0 | 3.56 | 2.5 |
| | at 500° C. | 290 | 94.4 | 131.8 | 27.2 | 13.1 | 0.3 | 4.41 | 3.2 |
| Co1ZnAl-LDH | Reduced | 230 | 50.0 | 61.5 | 15.0 | 7.5 | 0 | 3.62 | 2.7 |
| | at 300° C. | 290 | 97.3 | 142.5 | 36.3 | 12.4 | 0.6 | 3.68 | 2.9 |
| | Reduced | 230 | 65.4 | 71.4 | 18.1 | 7.0 | 0 | 3.53 | 2.8 |
| | at 500° C. | 290 | 97.6 | 122.6 | 25.7 | 12.2 | 0.1 | 4.16 | 3.2 |

RH$_2$/RCH$_3$ OH shows ratio of rate of H$_2$ production to rate of methanol conversion.

CoCuZnAl-oxide catalysts are new for the oxidative steam reforming of methanol (OSRM) reaction. These catalysts have not been reported so far even for the traditional steam reforming of methanol (SRM) or partial oxidation of methanol (POM) reactions for H$_2$ production.

As previously explained in detail, the present invention relates to catalysts for producing hydrogen by oxidative steam reforming of methanol, methods of producing the same, and methods of producing hydrogen gas by oxidative steam reforming of methanol using these catalysts. By means of the present invention, results are realized in that 1) it is possible to provide novel oxide catalysts for hydrogen gas production by oxidative steam reforming of methanol, 2) it is possible to produce hydrogen gas with no CO by-product by oxidative steam reforming of methanol using these catalysts, 3) it is possible to provide new methods of producing hydrogen gas as a new energy source, etc.

What is claimed is:

1. A method of producing hydrogen gas, comprising the step of:

converting methanol to hydrogen gas without generating CO gas by oxidative steam reforming reaction wherein partial oxidation of methanol and steam reforming reaction are performed simultaneously in the presence of both air and steam using a CuZnAlZr catalyst, wherein the catalyst is produced by the steps of reacting mixture of aqueous solutions of each nitrate of Cu, Zn, Al, and Zr with an aqueous NaOH solution and aqueous Na$_2$CO$_3$ solution at pH of about 9;

aging at about 65° C., filtering, washing, and drying this precipitate to prepare a catalyst precursor consisting of a CuZnAlZr layered double hydroxide; and then calcining this catalyst precursor in an air ambient atmosphere at about 450° C. to obtain a CuZnAlZr oxide.

2. The method of producing hydrogen gas according to claim 1, wherein oxygen/methanol(molar ratio)=0.1 to 0.5 and
steam/methanol(molar ratio)=0.8 to 2.0.

3. The method of producing hydrogen gas according to claim 1, wherein the reaction temperature is 200 to 250° C.

* * * * *

UNITED STATES PATENT AND TRADEMARK OFFICE
CERTIFICATE OF CORRECTION

PATENT NO. : 7,025,947 B2 Page 1 of 1
APPLICATION NO. : 10/898318
DATED : April 11, 2006
INVENTOR(S) : Suzuki et al.

It is certified that error appears in the above-identified patent and that said Letters Patent is hereby corrected as shown below:

On the title page, Item (73), the Assignee information is incorrect. Item (73) should read:

-- Assignee: Japan as represented by Secretary of Agency of Industrial Science and Technology, Tokyo (JP) --.

Signed and Sealed this

Eighteenth Day of July, 2006

JON W. DUDAS
*Director of the United States Patent and Trademark Office*